United States Patent [19]

Moore et al.

[11] Patent Number: 4,485,692

[45] Date of Patent: Dec. 4, 1984

[54] AUXILIARY TRANSMISSION

[76] Inventors: Jeff D. Moore, 2315 Chapparal Trail; Eddie C. Moore, 389 Wildwood Ct., both of Mansfield, Tex. 76063

[21] Appl. No.: 389,243

[22] Filed: Jun. 17, 1982

[51] Int. Cl.³ .............................. F16H 3/02; F16H 3/08
[52] U.S. Cl. .......................................... 74/745; 74/369
[58] Field of Search ................... 74/745, 366, 369, 370, 74/371, 372; 192/53 F

[56] References Cited

U.S. PATENT DOCUMENTS

| 1,866,662 | 7/1932 | Matthews | 74/370 |
| 2,446,393 | 8/1948 | Russell | 74/388 R X |
| 2,462,779 | 2/1949 | Russell | 74/365 |
| 4,060,005 | 11/1977 | Bost | 74/745 |
| 4,279,178 | 7/1981 | Todd | 74/745 |

FOREIGN PATENT DOCUMENTS

| 986090 | 7/1951 | France | 74/745 |
| 465575 | 9/1951 | Italy | 74/745 |
| 605236 | 5/1960 | Italy | 74/745 |
| 2030239 | 4/1980 | Japan | 192/53 F |
| 113850 | 9/1981 | Japan | 74/745 |
| 335871 | 10/1930 | United Kingdom | 74/745 |
| 1197345 | 7/1970 | United Kingdom | 74/372 |

OTHER PUBLICATIONS

Sherman Combination Transmission, 10/51.

Primary Examiner—Allan D. Herrmann
Assistant Examiner—Dirk Wright
Attorney, Agent, or Firm—Jerry W. Mills; Gregory M. Howison; Nina Medlock

[57] ABSTRACT

An auxiliary transmission is provided for a light and medium duty truck having manual transmissions. The auxiliary transmission is an electrically actuated two speed gear system to be installed between the clutch and manual transmission for providing a direct pass through of engine rpm or for providing overdrive or underdrive depending on the gear set design.

1 Claim, 6 Drawing Figures

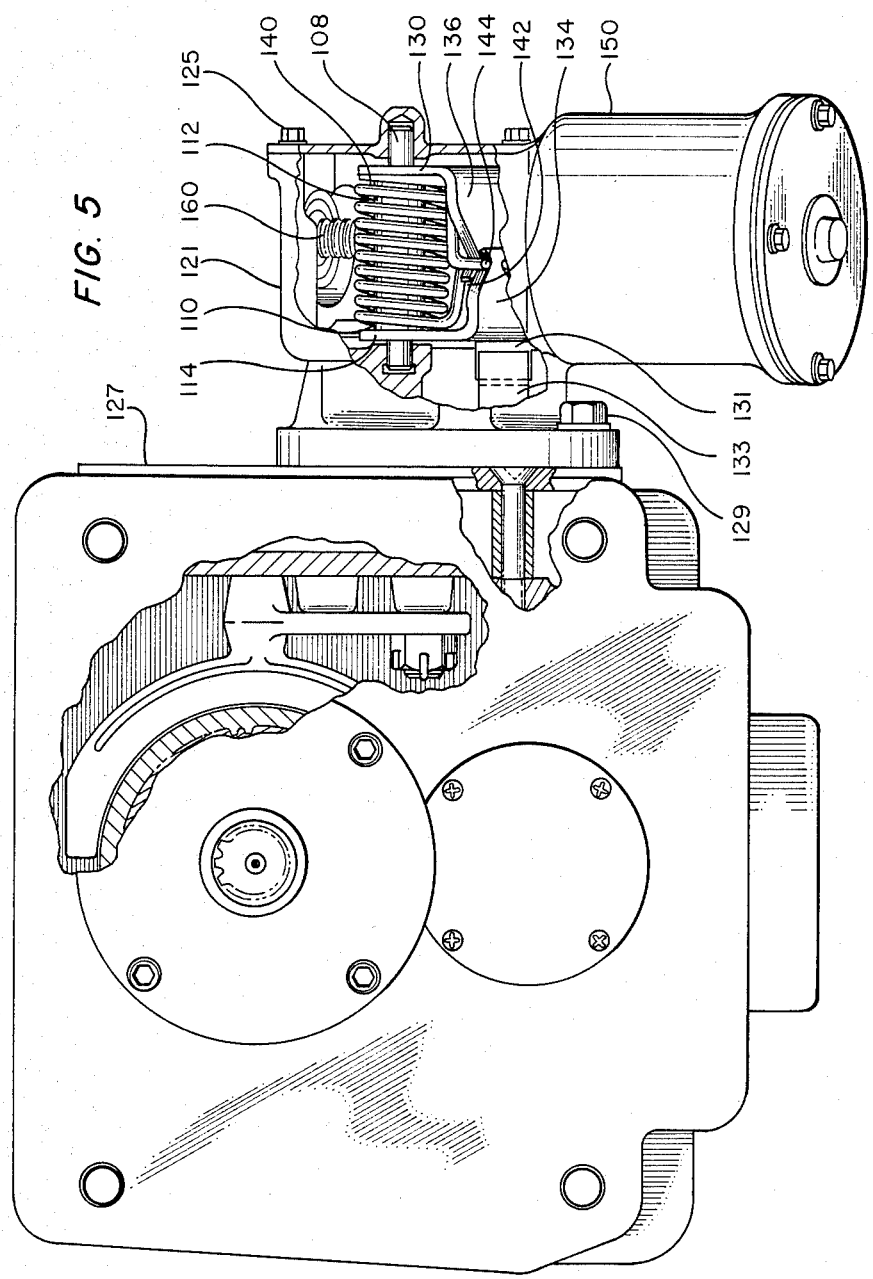

AUXILIARY TRANSMISSION

BACKGROUND OF THE INVENTION

Most light and medium duty trucks manufactured at the present time do not provide adequate transmission gearing ratios to provide the user the flexibility needed to move loads in the ten thousand pound to twenty-five thousand pound range and still be able to operate efficiently and economically at today's highway speeds when not loaded.

SUMMARY OF THE INVENTION

It is an object of the present invention to provide an auxiliary transmission designed to supplement the gearing range of an original manual transmission unit of a motor vehicle and which will provide the flexibility required to overcome the problems mentioned above.

It is a further object of the present invention to provide an auxiliary transmission that is easily installed. The auxiliary transmission mounts to the bell housing of the vehicle in which it is being installed with the manual transmission of the vehicle mounting to the rear of the auxiliary transmission. The drive shaft of the vehicle is shortened and rebalanced in installations of the auxiliary transmission on two wheel drive vehicles. Four wheel drive applications require the lengthening and rebalancing of the forward drive shaft as well.

In the preferred embodiment, the auxiliary transmission provides a 1:1 ratio and an overdrive ratio, allowing the user to select an overall ratio between the original ratios possible with the original transmission and rear end. The user therefore has the flexibility to operate the vehicle at generally lower engine revolution at a point nearer the peak torque point of the engine. Manipulation of the rear end ratios in the original vehicle would allow lower overall gear train ratios in direct mode to increase usable tractive force, but effectively higher overall gear train ratios in overdrive mode to maintain fuel economy.

In overdrive mode, users with power take off units can increase power take off speeds if desired, or lower engine RPM to maintain current power take off speeds.

Because the auxiliary transmission mounts prior to the speedometer/odometer output, no modifications need be made to retain correct readings on this guage.

The auxiliary transmission is electrically actuated which allows remote electrical control, thus simplifying shifting and operation of the auxiliary transmission unit while retaining the same basic reliability of a manual shift unit.

BRIEF DESCRIPTION OF THE DRAWINGS

FIG. 5 shows an end view of the complete assembly with partial sectional views of the complete shifting mechanism.

DESCRIPTION OF THE PREFERRED EMBODIMENTS

Figure 1:
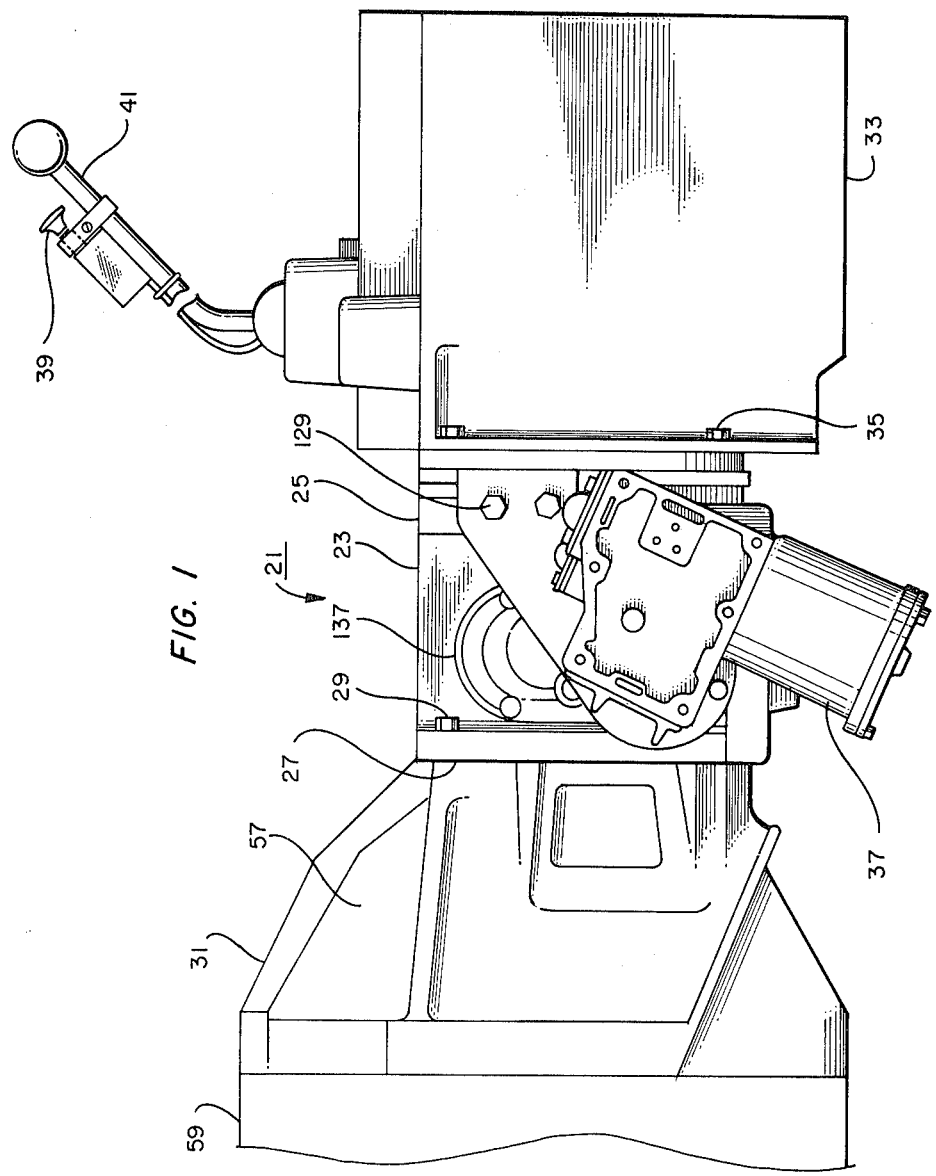
FIG. 1 shows the relationship of the installed auxiliary transmission of the present invention to the original vehicle components.

Referring now to FIG. 1 of the drawings, the auxiliary transmission of the present invention is identified at 21. It comprises a housing 23 and a rear cover 25 supporting the gears of the auxiliary transmission. The front 27 of the housing is mounted by bolts 29 to the rear of the bellhousing 31 of the vehicle in which it is installed in the same manner as the original transmission is mounted. The vehicle's original manual transmission 33 then is mounted by bolts 35 to the rear cover 25 of the auxiliary transmission just as it would to the vehicle's bellhousing. Also provided is an electrical shift actuator 37 controlled by a remote push-pull electrical switch 39 shown mounted to the gear shift lever 41 of the original transmission.

Figure 2:
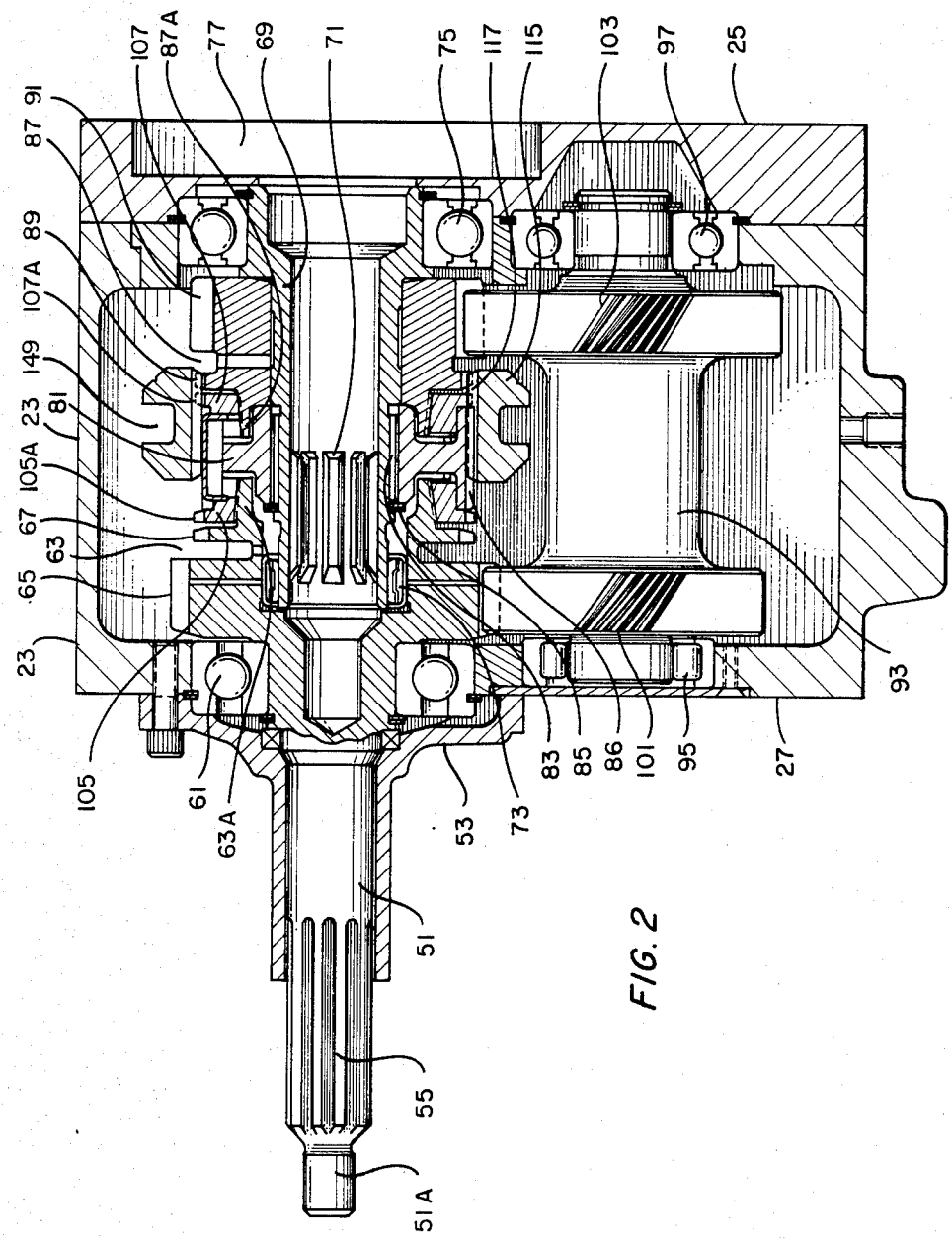
FIG. 2 is a true section through the auxiliary transmission box.
Figure 3:
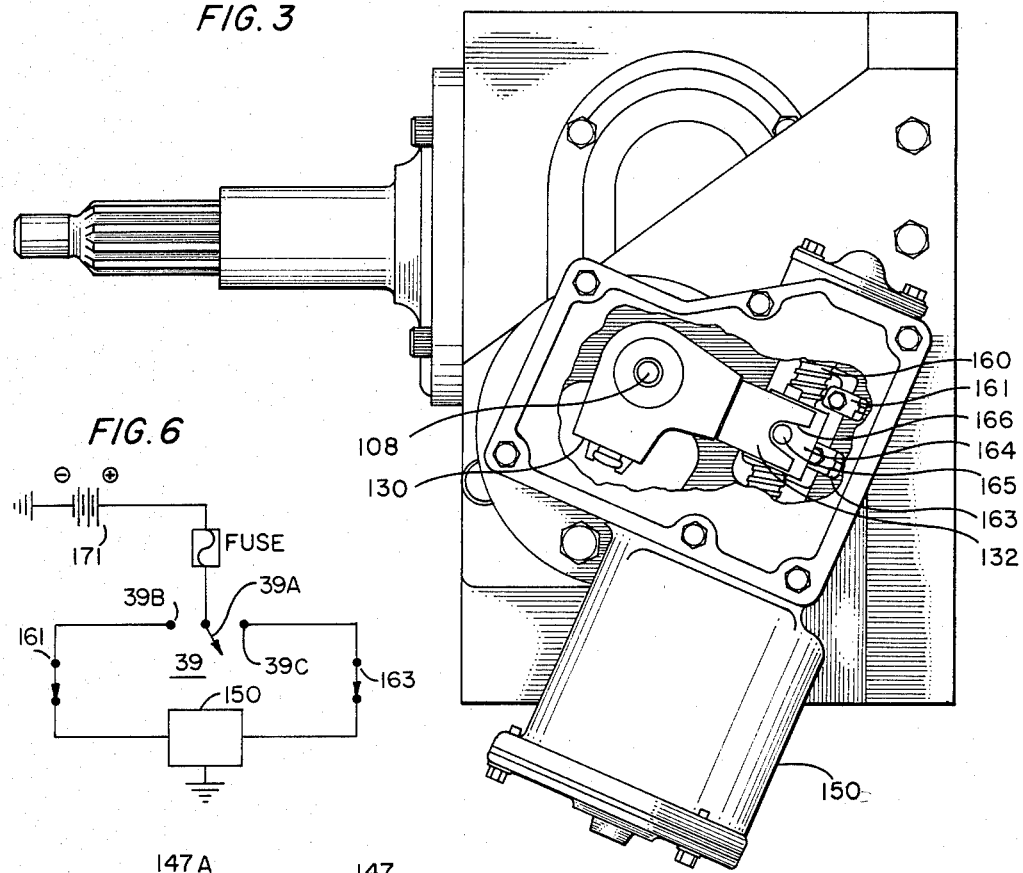
FIG. 3 shows a view of the complete unit with a partial section through the electrical shift actuator.

Referring to FIG. 2, the two speed gear system comprises a rotatable splined input shaft 51 extending from the front of the housing 23 through housing portion 53 and having forward external splines 55 to be mated with the internal splines of the disc of the clutch 57 (FIG. 1) located in the bellhousing 31. The rear portion of the engine of the vehicle is identified at 59. The input shaft 51 is supported for rotation by bearings 61 and has a compound gear 63 formed at its rear end. The compound gear 63 comprises main drive helical teeth 65 and clutch teeth or splines 67.

A hollow rotatable output sleeve 69 having internal splines 71 is located in the housing 23. The sleeve 69 is supported for rotation by bearings 73 and 75. The hollow output sleeve 69 is adapted to receive the splined input shaft of the transmission 33 through opening 77 formed through the cover 25 such that the splines of the output shaft of the transmission 33 will mate with the splines 71 of the sleeve 69.

A synchronizer or coupling hub 81 is fixedly connected around the output sleeve 69 for rotation therewith. Connection is by way of internal and external splines 83 formed on hub 81 and on sleeve 69 respectively and a snap ring 85. The synchronizer hub 81 has external teeth or splines 86. A rear auxiliary compound gear 87 is rotatably located around the output sleeve 69 whereby the gear 87 and the sleeve 69 may rotate relative to each other. The auxiliary gear 87 comprises clutch teeth or splines 89 and a gear having external helical teeth 91.

Also located in the housing 23 is a counter shaft 93 supported for rotation by bearings 95 and 97. The counter shaft 93 has helical drive teeth 101 which engage drive teeth 65 of input shaft 51 and helical drive teeth 103 which engage the teeth 91 of the auxiliary gear. For purposes of clarity, only a portion of the teeth 101 and 103 are shown in FIG. 2.

Located on opposite sides of the synchronizer hub 81 are blocking rings 105 and 107 having external teeth or splines 105A and 107A respectively. The rings 105 and 107 are in frictional contact with portions 63A and 87A of compound gears 63 and 87 respectively and may rotate relative to portions 63A and 87A.

A synchronizer collar 115 is located around the synchronizer hub 81 and has internal teeth or splines 117 which engage the external teeth 86 of the hub 81. The synchronizer collar 115 may be moved to a rear position as shown in FIG. 2 such that its teeth 117 engage teeth 86 of hub 81, teeth 107A of ring 107 and clutch teeth 89 of the auxiliary gear 87. In the rear position, the teeth 117 of the collar 115 do not engage teeth 105A of ring 105 or clutch teeth 67 of the compound gear 63. In addition, the synchronizer collar 115 may be moved to a forward position such that its teeth 117 engage teeth 86 of hub 81, teeth 105A of ring 105 and clutch teeth 67 of compound gear 63. In the forward position, the teeth 117 of collar 115 do not engage teeth 107A of ring 107 or clutch teeth 89 of auxiliary gear 87.

Figure 4:
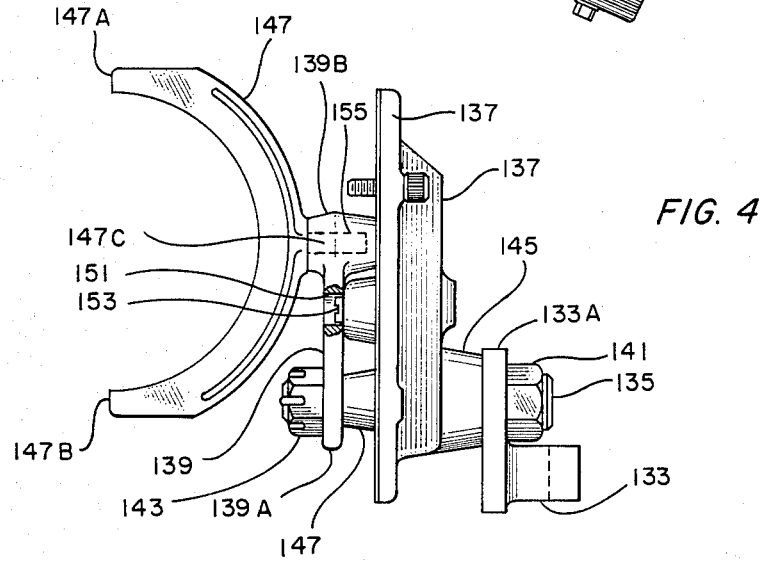
FIG. 4 shows an end view of the mechanical shift mechanism which is driven by the electrical shift actuator.

The electrical shift actuator 37 and the yoke of FIG. 4 are employed for shifting the synchronizer collar 115 to either the forward or rear positions as will be described subsequently.

The splined input shaft 51 is driven by the dry clutch disc assembly of the original vehicle and is supported at its outboard end 51A in the original flywheel pilot bushing. The output sleeve 69 is coupled to the input shaft of the vehicle's original transmission by means of the internal splines 71 of the sleeve 69 and the external splines of the original transmission's input shaft. When the synchronizer collar 115 is in the forward position, its teeth 117 engage the clutch teeth 67 of the input shaft 51 whereby the collar 115 is driven by the input shaft 51. The collar 115 in turn drives the hub 81 due to the matching of the internal and external teeth 117 and 86 of the collar 115 and hub 81 respectively. The output sleeve 69 in turn drives the input shaft of the vehicles's original transmission. The direct coupling in the forward positions provides a 1 to 1 ratio in the auxiliary transmission and direct pass through of engine torque, horsepower, and RPM. Thus the input shaft of the original transmission is driven at the same RPM as the input shaft 51 of the auxiliary transmission when the synchronizer collar 115 is in the forward position. When the collar 115 is in the forward position, the input shaft 51 also drives the counter shaft 93, through the coupling of teeth 65 and 101, which in turn drives the auxiliary gear 87 through the coupling of teeth 103 and teeth 91 of the auxiliary gear. In the direct drive mode (forward position of collar 115) the auxiliary gear 87 is not coupled to the output sleeve 69 and rotates around it at a different speed.

When the synchronizer collar 115 is in its rear position its internal teeth engage the clutch teeth 89 of the auxiliary gear 87 and the input shaft 51 drives the counter shaft 93 through the matching of helical gear teeth 65 and 101 which in turn drives the gear member 87 through the matching of helical gear teeth 103 and 91. Since the gear member 87 is rigidly coupled to the synchronizer collar 115 by way of clutch teeth 89, power transmission continues to the coupling hub 81 through the internal/external splines of the collar 115 and hub 81 and on to the output sleeve 69 through the internal/external splines 83 of the hub 81 and output sleeve 69. The output sleeve 69 in turn drives the input shaft of the vehicle's original transmission through the matching splines of those parts as previously explained at either increased (overdrive) or decreased (underdrive) rate of revolution with respect to the auxiliary transmission's input shaft 51, depending on the gear set design.

In the preferred embodiment, the gears are designed such that the auxiliary transmission 21 is a two speed overdrive unit whereby it provides a direct 1 to 1 ratio when the collar 115 is in the forward position and an overdrive ratio when the collar 115 is in the rear position In this embodiment, the compound gear 63, the blocking rings 105 and 107 the collar 115 and the gear member 87 each has twenty-seven teeth 67, 105A, 107A, 117, and 89 respectively. The input shaft 51 has thirty teeth 65; the counter shaft 93 has twenty teeth 101 and twenty-three teeth 103; and the gear member 87 has twenty-seven teeth 91 to provide a 28% overdrive or a 0.782 to 1 ratio. For an underdrive auxiliary transmission, input shaft 51 would have a different number of teeth 65, the counter shaft 93 would have a different number of teeth 101 and 103, and the gear member 87 would have a different number of teeth 91.

Referring now to FIGS. 3, 4, 5, and 6 there will be described the electrical shift actuator 37 and the remote push-pull electrical switch 39. The actuator 37 is a modified Eaton Corporation two speed shift assembly identified as part No. 41059. Such a shift actuator is described in detail in U.S. Pat. No. 2,462,779. Reference also is made to U.S. Pat. No. 2,446,393. U.S. Pat. Nos. 2,462,779 and 2,446,393 are incorporated by reference into this patent application.

The shift actuator 37 comprises members 110, 114, 134 and 112, 130, 136 adapted to rotate relative to each other on a pin 108 supported by housing structure 121 and cover 123 mounted to the housing structure 121 with bolts 125. Housing structure 121 is rigidly mounted to the auxiliary transmission's housing 23 and rear cover by the use of a rigid mounting bracket 127 and bolts 129. A helical spring 140 is located around members 110 and 112, and between members 114 and 130. The spring 140 has ends 142 and 144 adapted to engage members 134 and 136. A small, high RPM, twelve volt direct current motor 150 is provided which drives a ball screw 160 having a nut 164 or block adapted to travel along the screw 160. A pin 165 extends from block 164 and is located in a slot 166 formed in arm 132 which extends from member 130. A member 131 is attached to member 114 around which is fitted a slotted lever 133. Lever 133 is fixedly secured to one end of a rod 135 which extends through cover 137. Cover 137 is secured to housing 23. The other end of the rod 135 has a cam 139 fixedly secured thereto The lever end 133A is slotted to receive the mating end of the rod 135 and is held in place by a nut 141. The cam end 139A is slotted to receive the mating end of the rod 135 and is held in place by a nut 143. The rod 135 is supported for rotation by bearing members 145 and 147. When the lever 133 is rotated in either direction, the rod 135 and hence the cam 139 is rotated in either direction.

The other end 139B of the cam 139 supports a yoke 147 which has ends 147A and 147B which are fitted in an annular slot 149 formed in synchronozer collar 115. The member 110, 114, 134 can be rotated in either direction on pin 108 to rotate the lever 133, rod 135 and hence the cam 139 in either directions. This causes the yoke 147 to be moved along a small arc in either direction to move the synchronizer collar 115 to either the forward or rearward position. The cam 139 has a small arc shaped slot 151 in which is located a pin member 153 secured to cover 137 to prevent overtravel of the cam 139 in either direction. The yoke 47 has a rod 147C which is located in an aperture 155 formed in the end 139B of the cam such that the yoke 147 can turn relative to the cam 139.

The direction of rotation of the motor 150 is controlled by the position of the switch 39 which is of the single pole double throw type. Depending on the throw position of the switch 39 the motor 150 will be driven in either a clockwise or counter clockwise direction to rotate the ball screw 160 in either a clockwise or counter clockwise direction. This will drive the block 164 in one direction or the other and hence rotate member 112, 130, 132, 136 in one direction or the other to preload the helical spring 140. As long as the clutch pedal of the vehicle is not depressed, the tension on the gears will prevent the spring 140 from turning the member 110, 114, 134 whereby the yoke 147 cannot move the synchronizer hub 115. When the clutch pedal of the vehicle is depressed, the tension will be relieved whereby the preloaded spring 140 will cause member 110, 114, 134 to rotate to cause the yoke 147 to move the synchronizer collar 115 to the forward or reverse position depending on which position the switch 39 and synchronizer hub 115 were originally in. When the switch 39 is moved to an opposite position, the motor 150 and screw 160 will be driven in an opposite direction to drive the block 164 in an opposite direction whereby member 112, 130, 132, 136 will be rotated in an opposite direction to preload the helical spring 140 in an opposite direction. When the clutch pedal is released the member 110, 114, 134 will be rotated in an opposite direction whereby the yoke 147 and hence the synchronizer hub 115 will be moved to an opposite position.

Members 108, 110, 112, 114, 130, 132, 134, 136, 140, 142, 144, 150, 160, 164, 165 and 166, correspond with the same identified members as disclosed and described in U.S. Pat. No. 2,462,779 and reference is made to this patent for a more detailed description of this shift actuator.

The Eaton No. 41059 electrical shift unit has been modified by providing two normally closed limit switches 161 and 163 each of which is opened by the block 164 when it is driven by the ball screw 160 to engage either of switches 161 or 163. Opening of either of switches 161 or 163 breaks the circuit to the motor 150 to stop it from rotating when the block 164 is driven in either direction to its maximum limits where switches 161 and 163 are located.

Figure 6:
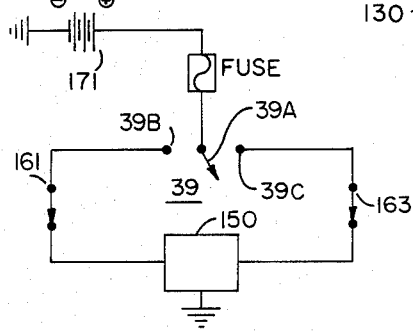
FIG. 6 is an electrical schematic useful in understanding the operation of the electrical shift actuator.

Referring to FIG. 6, switch member 39A is connected to the non-grounded side of the vehicle battery 171 and is adapted to engage either terminal 39B or 39C. Terminal 39B is connected to the motor 150 by way of normally closed limit switch 161 and terminal 39C is connected to the motor 150 by way of normally closed limit switch 163. Motor 150 is a reversable motor and is driven in one direction when current flows through the motor in one direction (by way of closed limit switch 161) and is driven in an opposite direction when current flows through the motor in an opposite direction (by way of closed limit switch 163). When switch member 39A engages terminal 39B, the motor is driven in one direction until block 164 engages and opens switch 161 at which time the motor stops. When switch member 39A engages terminal 39C, the motor is driven in an opposite direction until block 164 engages and opens switch 163 at which time the motor stops. When the block 164 is out of engagement with either of switches 161 or 163, the switches automatically close.

The auxiliary transmission of the present invention may be installed on any light or medium duty Chevrolet, Ford or GMC truck from 1968 through 1982 having a three or four speed manual transmission. For each gear it can provide a 28% overdrive if needed. For either a Chevrolet, Ford or GMC truck a different size input shaft 51 and output sleeve 69 will be provided, however, the remainder of the auxiliary transmission will be the same.

Reference is made to pages 7B(1-23) and 7C(1-14) of the 1981 Chevrolet Light Duty Truck Service Manual for a description of a typical Chevrolet clutch and manual transmission between which the auxiliary transmission of the present invention may be installed.

The speedometer cable of the trucks in which the auxiliary transmission 21 is adapted to fit attaches to a drive gear in the regular transmission. By locating the auxiliary transmission between the clutch of the bell housing and the original transmission rather than behind the regular transmission, modifications or adjustments of the speedometer do not have to be made in order to obtain a true speed. Moreover, a transmission acts as a torque multiplier. If the auxiliary transmission were located behind the original transmission it would have to be made much stronger and heavier than as in the present case where it is located in front of the original transmission. For a two wheel drive vehicle the only modification required for installing the auxiliary transmission of the present invention is to shorten and rebalance the drive shaft of the vehicle. In a four wheel drive vehicle, the forward drive shaft also would have to be lengthened and rebalanced.

We claim:

1. An auxiliary transmission for use on a motor vehicle having a manually operable clutch and a manual transmission with a gear shift lever and having an input shaft, comprising:

a rotatable input shaft adapted to be coupled to the clutch and a hollow rotatable output sleeve adapted to receive the input shaft of the transmission of the motor vehicle, a forward gear means connected to said input shaft and having first and second spaced apart external teeth formed thereon, said second teeth being located rearward of said first teeth, a hub connected to said output sleeve rearward of said forward gear means for rotation with said output sleeve and having external teeth formed thereon, a rear gear means rotatably located around said output sleeve rearward of said hub and having third and fourth spaced apart external teeth formed thereon, said fourth teeth being located rearward of said third teeth, a counter shaft having forward external teeth at a forward end engaging said first teeth of said forward gear means and rearward external teeth at a rear end engaging said fourth teeth of said rear gear means for rotating said rear gear means, a collar having internal teeth engaging said external teeth of said hub and engagable with said second teeth of said forward gear means or with said third teeth of said rear gear means, said collar being movable to a forward position where said internal teeth engage said external teeth of said hub and said second teeth of said forward gear means for causing said output sleeve to be driven at the same rpm as said input shaft is driven, said collar being movable to a rearward position where said internal teeth engage said external teeth of said hub and said third teeth of said rear gear means for causing said output sleeve to be driven at a rpm different from the rpm at which said input shaft is driven, control means for moving said synchronizer collar to said forward or rearward positions, said control means including an electrical motor rotatable in either of two directions, mechanical apparatus movable by said electrical motor between first and second positions in dependence upon the direction of rotation of said electrical motor, limit switch means responsive to location of said mechanical apparatus at either said first or second positions for terminating operation of said electrical motor, and switch means connected to said electrical motor for being attached adjacent the gear shift lever of the manual transmission and having two positions, one position operable to cause said electrical motor to rotate in one direction to move said collar to said forward position and the other position to cause said electrical motor to rotate in a second direction to move said collar to said rearward position.

* * * * *